Patented Feb. 4, 1941

2,230,624

UNITED STATES PATENT OFFICE 2,230,624

EXTRACTION OF PROTEIN FROM PEANUTS

Andrew McLean, Saltcoats, Scotland, assignor to Imperial Chemical Industries Limited, a corporation of Great Britain No Drawing. Application February 4, 1939, Serial No. 254,741. In Great Britain February 16, 1938

7 Claims. (Cl. 260—112)

This invention relates to the extraction of proteins from peanuts; and it comprises a method of extracting the globulins in colorless form from residues left in regaining oil from peanuts wherein the residues are extracted with an alkaline aqueous solution at a pH not exceeding 8.5 at any time and being 8 to 8.5 in the final stages of the extraction, and recovering the globulins from the solution so formed by acidification, advantageously with sulphur dioxide; all as more fully hereinafter set forth and as claimed.

The globulins ("arachin" and "conarachin") contained in peanuts (Arachis) have been found to be an advantageous material for the production of artificial fibers, much like wool in their properties and susceptible of being dyed, spun, woven, etc., in much the same manner as wool. In these methods a light-colored material of reasonable purity is desirable. A light color is particularly necessary. In these methods, which are not part of the present invention, protein from peanuts is dissolved or dispersed in urea solutions. The urea acts as a denaturant, changing the physical form of the globulin molecule of the protein into one better adapted for making filaments. The protein gives a thin dispersion which can be clarified to free it of mechanical impurities and gradually thickens on ageing into a form suitable for extrusion. The aged solution is extruded in the ordinary ways used in making filaments; extrusion being into an aqueous bath adapted to remove the urea. There may or may not be some acid in this bath and the filaments may afterwards be treated in various ways not here important. In making the spinning solution the urea acts as a solvent or peptizing agent. The solvent action may be accelerated by small amounts of other materials not here important.

Shelled peanuts as they come on the market, carry a brownish red seed coat containing a coloring matter soluble in many aqueous alkaline solutions. If this pellicle is removed the nuts are known as blanched nuts. Removal of the pellicle adds to the cost of the operation and moreover its removal is not usually complete.

The object achieved in the present invention is the production of a high yield of light colored protein from peanut residues left after extracting oil; either residues from blanched or from unblanched nuts. The protein removed in the present invention is particularly applicable for fiber-making operations.

I have found that by extracting the globulins from the oil-freed peanuts by an alkaline solution maintained at a pH between 8.5 and 8, the color is not extracted; colorless extracts are obtained. Any residue left after extracting the natural oil from peanuts with solvents or by pressure extraction may be used, irrespective of whether the peanuts were blanched or unblanched. The alkaline solution is an effective solvent for the globulins and when maintained at this pH does not dissolve the coloring matters. After the alkaline extract is separated from the residue it may be acidified and the dissolved protein recovered.

Suitable alkaline materials for use according to my invention are mild or caustic alkalis, such as sodium hydroxide or carbonate, or ammonia, and strongly alkaline salts such as sodium sulfide; alkaline substances strong enough to enable maintenance of the specified pH during the extraction.

From the point of view of yield the alkaline earths such as lime water are not so satisfactory as caustic soda, as some of the protein which is soluble in the caustic soda is insoluble in lime water, but with regard to color and suitability for spinning lime water gives good results.

As successive batches of peanut meal may require slightly different quantities of alkali to bring the alkalinity of the suspension to the desired pH value, I prefer to add the alkali in small portions and to follow the consequent changes in alkalinity of the suspension by means of a suitable external indicator, as in the chemical titration of an opaque liquid. The following indicators have a color change within the pH range desired according to my invention.

| Indicator | Color change | pH range |
|---|---|---|
| Neutral Red | Red to yellow | 6.8– 8.0 |
| m-Nitrophenol | Colorless to yellow | 6.8– 8.2 |
| Phenol Red | Yellow to red | 6.9– 8.4 |
| α-Naphthol-phthalein | Pink to greenish blue | 7.4– 8.7 |
| Cresol Red | Yellow to red | 7.2– 8.8 |
| Thymol Blue | Yellow to blue | 8.0– 9.6 |
| Phenol-phthalein | Colorless to red | 8.1–10.0 |
| Litmus | Red to blue | 5.0– 8.0 |

A mixture of indicators, such as one of the so-called universal indicators, may be used to follow the change in alkalinity of the solution, or I may use an indicator such as Phenol Red or Cresol Red to show the final stage of the extraction, in conjunction with a more acid indicator such as litmus or Bromthymol Blue (yellow to blue, 6.0–7.6) which gives warning when the acidic material in the nut meal is approaching exhaustion.

When the mixture has been maintained at the desired alkalinity for a time sufficient for substantially complete extraction of the protein soluble at that alkalinity, the mixture may be settled or, preferably, centrifuged to remove suspended matter. The insoluble matter may be stirred up with water and again centrifuged, and the washings added to the main solution; which may then be clarified in e. g. a super-centrifuge of the high-speed type. The soluble protein may then be reprecipitated from the solution by a suitable change in the alkalinity; for instance by neutralizing the alkali with sulphur dioxide, or by allowing acid-forming fermentation to occur in the solution.

The progress of the neutralization may be followed by means of a suitable external indicator; for instance, Methyl Orange (red to yellow, 3.0–4.4) or Bromphenol Blue (yellow to blue 3.0–4.7).

The invention is further illustrated by the following examples, in which the parts are parts by weight.

*Example 1*

200 parts of extracted peanut meal from unblanched nuts are stirred vigorously with 3500 parts water at 20° C. for 5 to 10 minutes. 330 parts of a 1.2 per cent solution of sodium sulphide are run in over a period of 14 minutes. During the addition hydrogen sulphide is evolved, and the mixture does not appreciably affect the color of red litmus. The bath is not alkaline to litmus. Further addition of the sodium sulphide solution, however, causes a marked rise in the pH value, and the rate of addition of alkali is therefore reduced. At the end of 30 minutes 170 parts of sodium sulphide solution have been added, and the pH value of the solution is found to be approximately 8.0 to 8.5. Stirring is continued for a further hour, by which time the extraction is nearly complete. The mixture is now centrifuged, and yields a yellow-green fluorescent solution having a pH value of 8.0. Sulphur dioxide is now bubbled into the extract at ordinary temperature with stirring until the pH value falls to 4.8 which is in the iso-electric region; by which time a copious white precipitate of protein forms. This is allowed to settle, and is centrifuged, washed and dried. 84 parts of air-dry protein are thus obtained in the form of a white powder. The powder dissolves easily in concentrated aqueous urea solution forming an almost colorless solution which may be extruded and spun into filaments of excellent quality.

*Example 2*

200 parts extracted peanut meal from unblanched nuts are stirred vigorously with 3500 parts water at 20° C. as in Example 1. 150 parts of a 1.2 per cent solution of sodium hydroxide in water are added over a period of 20 minutes while the mixture is kept stirred. The pH value reaches a value of about 8.0–8.5 at the end of the operation. Stirring is continued for one hour. After clarification the solution has a pH value of 8.3, and the solution is almost entirely devoid of undesirable color. Sulphur dioxide is passed through the solution until the pH value is 4.5, also in the iso-electric region; and the white precipitate of protein is worked up as in Example 1. The dry product amounts to 84 parts by weight and is white in color, yielding an almost colorless solution in concentrated aqueous urea, which on standing becomes unusually viscous before it gelates. This is an advantageous property. The solution may be spun into filaments of excellent color and quality.

Instead of the sodium sulphide used in Example 1, I could have used sodium hydroxide, sodium polysulphide, sodium carbonate, sodium cyanide, or the hydroxides or salts of the alkalis and alkaline earths. The point is maintenance of the specified pH range during the extraction rather than the use of any particular alkaline substance. Any salt chosen should of course be one without ill effect on the protein.

This invention is a valuable advance in the art as it enables the protein to be extracted from peanuts by a simple process which omits the expensive blanching step. The resulting protein has better spinning qualities than those produced by old methods and will form spinning solutions from which filaments of excellent appearance and physical properties may be obtained by a wet spinning process.

As many apparently widely different embodiments of this invention may be made without departing from the spirit and scope thereof, it is to be understood that the invention is not limited to the specific embodiments thereof except as defined in the appended claims.

I claim:

1. In the extraction from peanuts of light-colored globulins particularly adapted for use in making artificial fibers, the process which comprises agitating an aqueous suspension of finely divided oil-freed peanut residues in the presence of an alkaline material of such strength and in such dilution that the hydrogen ion exponent or pH value of the mixture in the latter stages of extraction is between 8 and 8.5 and does not exceed 8.5 at any time, separating insoluble matter from the aqueous phase and recovering the protein contained in said aqueous phase.

2. The process of claim 1 wherein the alkaline material used in maintaining the pH range between 8 and 8.5 is added portionwise in small successive portions.

3. The process of claim 1 wherein the alkaline material is sodium hydroxide.

4. The process of claim 1 wherein the alkaline material is sodium carbonate.

5. The process of claim 1 wherein the alkaline material is sodium sulphide.

6. The process of claim 1 wherein recovery of the protein from the alkaline solution is effected by controlled additions of sulphur dioxide.

7. The process of claim 1 wherein protein is recovered from the liquid by acidification to a pH between 4.5 and 4.8.

ANDREW McLEAN.